(No Model.)

J. W. JAMES.
AIR OR WATER PURIFYING APPARATUS.

No. 368,891. Patented Aug. 23, 1887.

Witnesses.
Robert Emett
Dennis Sumby

Inventor:
Jack W. James.
By James L. Norris
Atty.

UNITED STATES PATENT OFFICE.

JACK W. JAMES, OF CUBA, TENNESSEE.

AIR OR WATER PURIFYING APPARATUS.

SPECIFICATION forming part of Letters Patent No. 368,891, dated August 23, 1887.

Application filed December 23, 1886. Serial No. 222,429. (No model.)

*To all whom it may concern:*

Be it known that I, JACK W. JAMES, a citizen of the United States, residing at Cuba, in the county of Shelby and State of Tennessee, have invented new and useful Improvements in Air or Water Purifying Apparatus, of which the following is a specification.

My invention relates to an apparatus for purifying, drying, heating, and electrifying the air of rooms in dwellings, hospitals, &c.; for aerating and purifying drinking-water; for impregnating the air of rooms with salt or other materials, and, generally, for deodorizing, disinfecting, and air-purifying purposes in any desired place.

The invention will be hereinafter more fully described, and then particularly set forth in the claims at the end of this specification.

Figure 1:
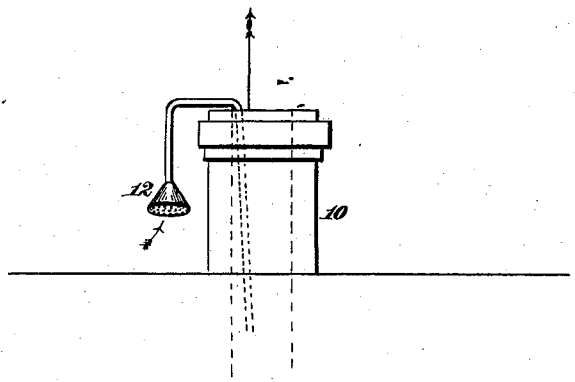
Figure 2:
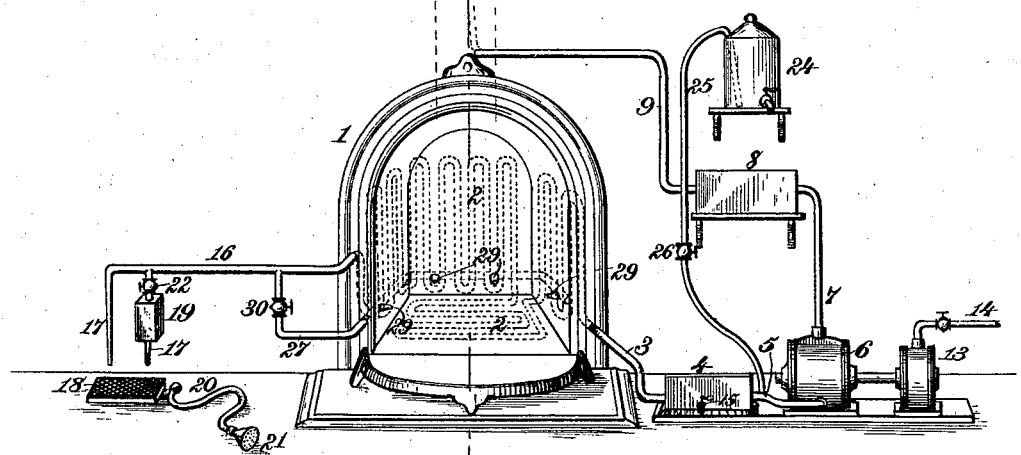

In the annexed drawings, illustrating the invention, Figure 1 is a front elevation of my purifying apparatus. Fig. 2 is a vertical section on the line $x\,x$ of Fig. 1.

In carrying my invention into effect I prefer to employ an open fire-place, 1, in the walls and hearth of which is arranged a continuous coiled pipe, 2, open from end to end. This coiled pipe 2 communicates at one end with a pipe, 3, that leads from a drying-chamber, 4, containing calcium chloride or other suitable material capable of absorbing moisture from air. This drying-chamber 4 communicates by means of a pipe, 5, with a rotary pump or fan, 6, which in turn communicates through a pipe, 7, with an air-purifying chamber, 8, consisting of a suitable closed receptacle containing charcoal or other air purifying and straining material. The air-purifying chamber or charcoal-receptacle 8 is provided with an air-inlet pipe, 9, which extends up the chimney or flue 10 to a sufficient height above the building, there curves downward a short distance, and carries at its end a strainer, 12, which is preferably bell-shaped or somewhat expanded and provided with numerous fine perforations or air-inlets.

The fan or pump 6 can be driven by a small turbine, 13, with water admitted through a pipe, 14, from a water-main or other source, or the fan can be driven by power in any other convenient manner.

When the fan or pump 6 is in operation, the external air will be drawn through the strainer 12 and pipe 9 into and through the closed air-purifying chamber or charcoal-receptacle 8, where it parts with any impurities that may have gained access to the inlet-pipe. From the chamber or receptacle 8 the purified air is drawn through the pipe 7 into the fan or pump 6, and is thence forced through the pipe 5 into and through the drying-chamber 4, in which, by contact with calcium-chloride or other desiccating material contained in said chamber, it parts with its moisture. This drying-chamber 4 may have a cock, 15, through which to draw off any water or liquid chloride that may collect.

After passing through the drying-chamber 4, the air, relieved of its moisture, is carried by the pipe 3 into the coils 2, in passing through which it becomes thoroughly heated and can be raised to any desired temperature. These coils 2, instead of being arranged in an open fire-place, can be made to form part of any suitable heating-stove, though I prefer an open fire-place as affording a better ventilation for the room.

The purified and dried air which is forced into the heating-coils 2, as above described, finds an exit into the room through a pipe, 16, at one side of the fire-place. This pipe 16 terminates, preferably, in one or more nozzles 17, of reduced diameter, whereby the dried and heated air is thrown with considerable force against a roughened glass plate, 18, supported or placed near the said nozzles and in the path of the escaping air-currents. The forcible impact of the dried and heated air upon the roughened glass plate generates an appreciable quantity of electricity, that passes into the atmosphere of the room by reason of the air being a better conductor than the glass. Some electricity is also produced by the friction of the air that is rapidly drawn and forced through the apparatus and by the heating of the air in the coils, which, together with the electricity resulting from the forcible contact of the air with the roughened glass plate 18, enters the atmosphere of the room and exerts a wholesome influence.

If desired, one of the nozzles 17 may form part of a disinfecting or deodorizing receptacle, 19, and to this nozzle may be attached a flexible tube, 20, provided with a rose, 21, to distribute the disinfectant or deodorizer over the clothing, and a cock, 22, can be placed in this nozzle to control the passage of air through the disinfectant. If desired, salt-water or any substance with which it is desired to impregnate the atmosphere of the room can be placed in the receptacle 19. The apparatus is thus of great utility in sick rooms and hospital-wards, and can be readily adapted to the exigencies of various cases.

As before mentioned, the heating-coils 2 can be arranged in any suitable or convenient manner, either in connection with a stove or open fire-place, in the latter case it being preferable to cover them with thin fire-bricks 23, as shown in Fig. 2, to prevent the burning out of the pipe and give a better appearance to the fire-place. With this apparatus there is a great economy in fuel, as the heat that generally escapes through the chimney is brought back into the room through the air-discharge nozzle, the draft is not interfered with, the fire burns better, and the room is well ventilated and supplied with large quantities of pure well-heated air. The several receptacles 4, 8, and 19, for containing the air drying, purifying, and disinfecting or deodorizing substances, are each provided with removable lids, so that their contents can be readily replenished when required.

If it is desired to aerate and keep cool a tank or closed vessel of water for drinking purposes, such tank or water-cooler 24 can be connected with the pipe 5 by means of a branch pipe or tube, 25, entering the water-cooler just beneath the rim of its cover and dipping down to near the bottom of the cooler, as shown, and this tube 25 can have a cock, 26, to control the passage of air to the cooler, as may be required.

The operation and advantages of this air-purifying apparatus and the various uses to which it can be applied will be obvious.

If desired, a branch, 27, may lead from the pipe 16 and run back around the fire-place and terminate with a closed end at 28. This branch pipe 27 has several small pointed openings or nozzles, 29, through which the dried and heated air from the pipe 16 can be injected among the fuel to facilitate combustion, and by means of a cock, 30, on the pipe 27 the injection of air into the flame can be controlled at will. The coiled pipe 2 can be arranged in any convenient way to absorb the greatest quantity of heat. In order to obviate any liability of lightning being conducted down the chimney along the air-inlet pipe 9, a properly grounded and insulated lightning-rod can be placed back of and above the fire-place and air-inlet pipe.

What I claim as my invention is—

1. The combination, with a fire-place and chimney, of an air-inlet pipe extending through the chimney and having a strainer at its outer end, a charcoal-receptacle communicating with the inner end of said pipe, a rotary fan or pump connected with said receptacle by an intermediate pipe, an air-drying chamber communicating with said fan or pump, a heating-coil arranged in the fire-place and communicating with the air-drying chamber, and air-discharge nozzles connected with the heating-coil, substantially as described.

2. The combination, with a heating-coil, air purifying and drying chambers, and an air-forcing pump, of air-discharge nozzles connected with the heating coil, and a roughened glass plate located opposite the air-nozzles, substantially as described.

3. The combination, with the air-inlet pipe 9, charcoal-chamber 8, pipe 7, and pump 6, of the pipes 5 and 25 and the water-cooler 24, substantially as described.

4. The combination, with the pump 6 and heating-coil 2, of the pipe 16, having air-discharge nozzles 17, and the disinfectant-chamber 19, connected with one of said nozzles, substantially as described.

5. The herein-described air purifying, drying, and heating apparatus, comprising the air-inlet pipe 9, purifying-chamber 8, pipe 7, pump 6, pipes 3 and 5, drying-chamber 4, heating-coil 2, discharge-pipe 16, nozzles 17, and roughened glass plate 18, substantially as described.

6. The combination, with the heating-coil 2 and the connected pipe 16 and the air drying and forcing devices, of the branch pipe 27, provided with cock 30 and air nozzles or openings 29, said branch pipe being extended from the pipe 16 back of the fire-place, substantially as described.

In testimony whereof I affix my signature in presence of two witnesses.

JACK W. JAMES.

Witnesses:
A. J. HARRIS,
M. T. GARVIN.